United States Patent

Bucca et al.

Patent Number: 5,807,953
Date of Patent: Sep. 15, 1998

[54] THERMOSTET POLYMERS FROM INORGANIC ARYLACETYLENIC MONOMERS

[75] Inventors: Daniel Bucca; Teddy M. Keller, both of Alexandria, Va.

[73] Assignee: The United States of America as represented by the Secretary of the Navy, Washington, D.C.

[21] Appl. No.: 687,700

[22] Filed: Jul. 26, 1996

[51] Int. Cl.[6] .............................. C08G 77/56; C08F 38/00
[52] U.S. Cl. .............................. 528/5; 526/239; 526/279; 526/285
[58] Field of Search ................................. 528/5; 526/239, 526/279, 285

[56] References Cited

U.S. PATENT DOCUMENTS

| | | | |
|---|---|---|---|
| 5,272,237 | 12/1993 | Keller et al. | 528/5 |
| 5,292,779 | 3/1994 | Keller et al. | 522/99 |
| 5,348,917 | 9/1994 | Keller et al. | 501/92 |
| 5,483,017 | 1/1996 | Keller et al. | 528/5 |

Primary Examiner—Fred Zitomer
Attorney, Agent, or Firm—Thomas E. McDonnell; John Karasek

[57] ABSTRACT

The present invention is a thermoset having the repeating unit:

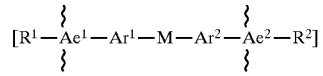

where $R^1$ and $R^2$ are independently selected from the group consisting of hydrogen, unsubstituted alkyl groups, substituted alkyl groups, unsubstituted aryl groups, and substituted aryl groups, where $Ae^1$ and $Ae^2$ are independently selected groups with one or more unsaturated carbon-carbon bond and at least two crosslinking moieties, where $Ar^1$ and $Ar^2$ are independently selected substituted or unsubstituted aromatic diradicals, and where M has the structure

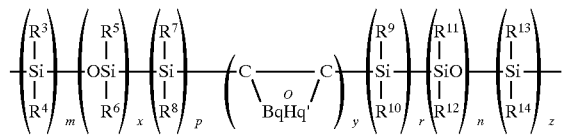

41 Claims, 4 Drawing Sheets a= —Si(CH$_3$)$_2$OSi(CH$_3$)$_2$CB$_{10}$H$_{10}$CSi(CH$_3$)$_2$OSi(CH$_3$)$_2$— b= —Si(CH$_3$)$_2$OSi(CH$_3$)$_2$— c= —Si(CH$_3$)$_2$—

Where M is:  a= —Si(CH3)2OSi(CH3)2CB10H10CSi(CH3)2OSi(CH3)2— b= —Si(CH3)2OSi(CH3)2— c= —Si(CH3)2—

THERMOSTET POLYMERS FROM INORGANIC ARYLACETYLENIC MONOMERS

BACKGROUND OF THE INVENTION

1. Field of the Invention

The present invention relates to the polymerization of monomers suitable to high temperature thermosets, and more particularly to the polymerization of monomers containing silane and/or siloxane groups, aryl groups, acetylene groups, and optionally carborane groups. The invention also relates to these thermosets.

2. Description of the Related Art

Thermoset polymers that are stable at high temperatures are sought for many high strength, high temperature applications, especially aerospace applications. A great deal of research has been performed to date on developing precursor oligomers and polymers that may be converted to thermosets, and further pyrolyzed to carbon or ceramics depending upon the starting materials.

Thermosets derived from monomer precursors are desired, due to the improved processibility of these precursors. Thermosetting precursor monomers that, as liquids at room temperature, melt at low temperatures (i.e., will be low melting solids), and have controllable viscosity, are being sought. Broader processing windows for thermoset precursors are also desired.

Other desired features for thermosets and the methods of making them include high char yield, low evolution of volatiles, and high density.

SUMMARY OF THE INVENTION

Accordingly, it is an object of this invention to provide cross-linked alkyl-aryl-silane thermosets, optionally including siloxane and/or carborane groups, that show high temperature stability (in excess of 1000° C.) and where the content of carborane within the thermosets can be varied.

It is a further object of this invention to provide ceramics with these groups that have high temperature stability.

It is a further object of the invention to make such thermosets and ceramics from monomeric precursors.

These and additional objects of the invention are accomplished by the structures and processes hereinafter described.

The present invention is a thermoset having the repeating unit:

$$[R^1-Ae^1-Ar^1-M-Ar^2-Ae^2-R^2]$$

where $R^1$ and $R^2$ are independently selected from the group consisting of hydrogen, unsubstituted alkyl groups, substituted alkyl groups, unsubstituted aryl groups, and substituted aryl groups;

where $Ae^1$ and $Ae^2$ are independently selected groups with one or more unsaturated carbon-carbon bond and at least two crosslinking moieties;

where $Ar^1$ and $Ar^2$ are independently selected substituted or unsubstituted aromatic diradicals; and where M has the structure $$\left(\begin{array}{c}R^3\\|\\-Si-\\|\\R^4\end{array}\right)_m \left(\begin{array}{c}R^5\\|\\-OSi-\\|\\R^6\end{array}\right)_x \left(\begin{array}{c}R^7\\|\\-Si-\\|\\R^8\end{array}\right)_p \left(C\underset{B_qH_{q'}}{\overset{O}{\diagup\diagdown}}C\right)_y \left(\begin{array}{c}R^9\\|\\-Si-\\|\\R^{10}\end{array}\right)_r \left(\begin{array}{c}R^{11}\\|\\-SiO-\\|\\R^{12}\end{array}\right)_n \left(\begin{array}{c}R^{13}\\|\\-Si-\\|\\R^{14}\end{array}\right)_z$$

where m is a positive integer, wherein x, p, y, r, n, and z are independently selected integers, where $z \neq 0$ when $n \neq 0$, and where $R^3$ through $R^{14}$ are independently selected from the group consisting of hydrogen, unsubstituted alkyl groups, substituted alkyl groups, unsubstituted aryl groups, and substituted aryl groups.

Another aspect of the present invention is a process for making thermoset polymers, comprising exposing to heat or light a monomer having the formula:

$$R^1-Ac^1-Ar^1-M-Ar^2-Ac^2-R^2$$

where $R^1$, $R^2$, $Ar^1$, $Ar^2$, and M are as above, and where $Ac^1$ and $Ac^2$ are independently selected alkynyl groups having 10 or fewer carbons and at least 1 carbon-carbon triple bond; and where the exposure to the heat or light is selected to initiate a cross-linking reaction between acetylenic moieties in the monomer.

Another aspect of the invention is the thermoset made by this process.

Another aspect of the invention is the ceramic made by pyrolyzing the thermoset of the invention, or the monomer precursor.

Another aspect of the invention is the ceramic made by pyrolyzing the monomer or the thermoset, and the method of making the ceramic of the invention.

BRIEF DESCRIPTION OF THE DRAWINGS

A more complete appreciation of the invention will be obtained readily by reference to the following Description of the Preferred Embodiments and the accompanying drawings in which like numerals in different figures represent the same structures or elements, wherein.

DETAILED DESCRIPTION OF THE PREFERRED EMBODIMENTS

Figure 1:
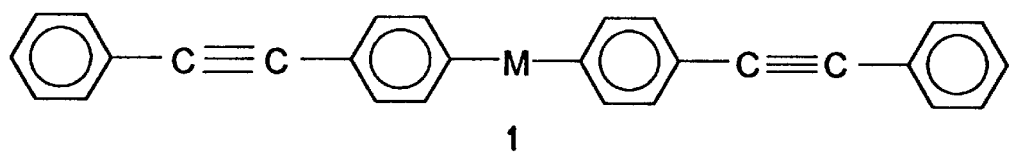
FIG. 1 shows three preferred monomeric precursors of the invention.

The following are incorporated by reference herein, in their entireties, and for all purposes:

(a) U.S. Pat. No. 5,483,017, for "High Temperature Thermosets and Ceramics Derived from Linear Carborane-(Siloxane or Silane)-Acetylene Copolymers", issued Jan. 9, 1996 to Keller et al (hereinafter Keller '017);

(b) U.S. patent application Ser. No. 08/540,148, for "High Temperature Ceramics Derived from Linear Carborane-(Siloxane or Silane)-Acetylene Copolymers", filed Oct. 6, 1995 by Keller et al. (hereinafter Keller '148 application);

(c) U.S. patent application Ser. No. 08/687,880, for "Inorganic Arylacetylenic Monomers", filed on date even herewith by Bucca et al., and designated Navy Case No. 77,458.

The monomers used in the present invention contain a group near the center of the molecule (designated "M" in the formula above), where this group contains at least a silane moiety, and optionally also any of the following: additional silane moieties, siloxane moieties, carborane moieties, and combinations thereof. The monomers used in the present invention also contain two aromatic groups (designated $Ar^1$ and $Ar^2$ in the formula above) on either side of the "M" group, two alkynyl groups (designated $Ac^1$ and $Ac^2$ in the formula above) bonded to the aromatic groups, and two terminal groups (designated $R^1$ and $R^2$ in the formula above).

Preferred "M" Groups

Depending on the particular properties desired, skilled practitioners will select appropriate values for m, n, p, q, r, x, y, and z.

Varying the ratio of carborane to silane groups can vary the properties of the monomer. More siloxane groups will lead to a lower melting point and therefore a broader processing window. More carboranyl groups will lead to better oxidative resistance. See Keller '148 application.

Preferred "M" groups include one or more silane moieties, one or more siloxane moieties, and one or more carboranyl moieties, and combinations thereof.

It is preferred to have at least one silane group interposed between any siloxane groups in M and the aryl groups $Ar^1$ and $Ar^2$, so that the oxygens in the siloxane groups are not directly bonded to the aryl groups. Accordingly, when x≠0, m≠0. Likewise, when n≠0, z≠0. In some circumstances it will be preferred to have M consist only of silane (and optionally siloxane) moieties. For such embodiments, y=0, and the proportions of m, x, and p (or equivalently r, n, and z) are adjusted to give the desired proportions of silane to siloxane. Typically, these will range from about 100:0 (silane:siloxane) to about 1:99.

In the structure

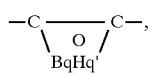

q and q' are independently selected integers from 3 to 16, inclusive. Suitable carboranyl groups are 1,7-dodecacarboranyl, 1,10-octacarboranyl, 1,6-octacarboranyl, 2,4-pentacarboranyl, 1,6-tetracarboranyl, 9-alkyl-1,7-dodecacarboranyl, 9,10-dialkyl-1,7-dodecacarboranyl, 2-alkyl-1,10-octacarboranyl, 8-alkyl-1,6-octacarboranyl, decachloro-1,7-dodecacarboranyl, octachloro-1,10-octacarboranyl, decafluoro-1,7-dodecacarboranyl, octafluoro-1,10-octacarboranyl, closo-dodeca-ortho-carboranyl, closo-dodeca-meta-carboranyl, closo-dodeca-para-carboranyl, and combinations thereof.

Good results have been obtained with compounds having m=x=y=z=n=1 and p=r=0 (designated herein as M moiety a), having m=x=1 and y=z=n=p=r=0 (designated herein as M moiety b), and having m=1 and x=y=z=n=p=r=0 (designated herein as M moiety c).

Preferred "Ar" Groups $Ar^1$ and $Ar^2$ may be the same or different. Suitable Ar groups include substituted or unsubstituted phenyl, substituted or unsubstituted naphthalene radical, substituted or unsubstituted anthracene radical, substituted or unsubstituted phenanthrene radical, and substituted or unsubstituted pyrine radical. Other suitable Ar groups include aromatic groups having at least one heterocycle. Appropriate heterocycles include substituted or unsubstituted pyridine, substituted or unsubstituted pyrole, substituted or unsubstituted furan, and substituted or unsubstituted thiophene.

It is preferred to have the Ar groups bonded to the M groups and the Ac groups at nonadjacent sites, to minimize stearic effects. For example, in the case of an Ar group having a single aromatic ring (such as a

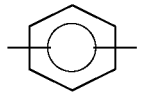

group), it is preferred to have the M and Ac groups at meta or para positions to each other. Meta substitution typically provides better polymerizing and/or processing properties, while para substitution typically provides better thermal properties.

Preferred "Ac" Groups $Ac^1$ and $Ac^2$ may be the same or different. As shown infra, a range of acetylenic groups are within the scope of the present invention. Ac groups may have one carbon-carbon triple bond. Ac groups may have two or more carbon-carbon triple bonds. In the case where the Ac groups have two or more triple bonds, two or more of these bonds may be conjugated. Alternatively, these two or more carbon-carbon triple bonds may be unconjugated. In the case where the adjacent terminal R group is H or phenyl (i.e., $R^1$ in the case of $Ac^1$ and $R^2$ in the case of $Ac^2$), the preferred Ac group is —C≡C—. In the case where the adjacent terminal R group is

the Ac group can be —C≡C—C≡C—.

Preferred "R" Groups $R^1$ and $R^2$ may be the same or different. Typical R groups include unsubstituted alkyl groups, hydrogen, and unsubstituted aryl groups. More typical R groups include alkyl groups and aryl groups, substituted with one or more halide or —OH groups. Preferred R groups include primary, secondary, and tertiary alkyl groups. More preferred R groups are taken from the group consisting of H, phenyl, substituted phenyl, substituted or unsubstituted alkyl having 6 or fewer carbons, substituted or unsubstituted naphthalene radical, substituted or unsubstituted anthracene radical, substituted or unsubstituted phenanthrene radical, and substituted or unsubstituted pyrine radical.

H-terminated monomers will tend to react at lower temperatures and therefore provide higher char yields. Aryl-terminated monomers (especially phenyl-terminated monomers) will tend to have broader processing windows.

Three preferred monomers are shown in FIG. 1 as 1a, 1b, and 1c.

Synthetic Routes for the Monomers

Figure 2:
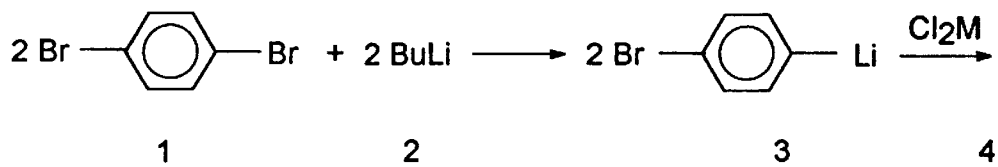
FIG. 2 shows an exemplary precursor synthesis according to the invention.
Figure 2:
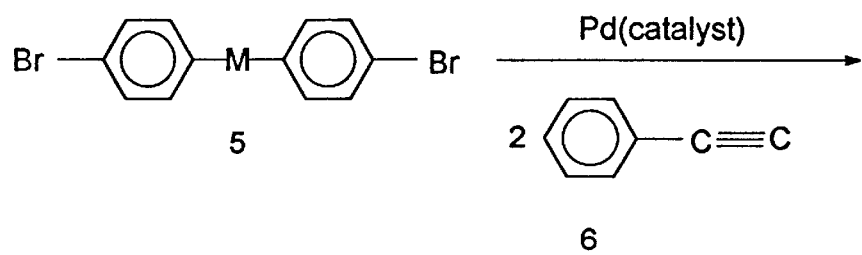
Figure 2:
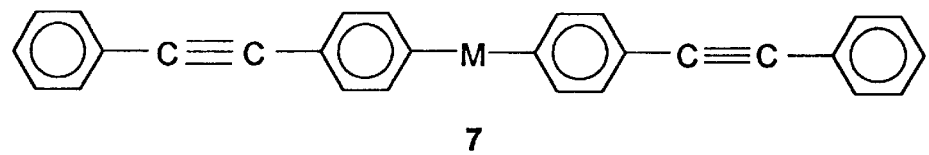

An exemplary synthesis is depicted in FIG. 2. As shown, an aryl dihalide (in this case, p-dibromobenzene) 1 undergoes a substitution reaction with n-butyllithium 2 to form a lithium aryl halide 3 (in this case, p-bromolithium benzene). 1,n-Dichlorinated M 4 (for the desired M group in the final product) reacts with the Li moieties in 3 to produce M with substituted bromoaryl groups in the 4 and 4' positions (1 and n denote opposing ends of the structure). The aryl groups correspond to the desired Ar groups in the final product.

This dihalide 5 is then reacted (typically with a Pd catalyst) with an acetylenic compound 6 containing the desired terminal group R and acetylenic group Ac, to yield the desired monomer 7.

To vary the aryl halide groups, e.g., to put a bromophenyl group in the 4 position, and a bromonaphthalenyl group in the 4' position, and in turn vary the Ar groups in the monomer so that $Ar^1 \neq Ar^2$, one would first add one equivalent of p-bromolithium benzene to the 4,4' dichlorinated M4 to produce a monochlorinated M4 with an aryl halide group in the 4 position. Then the addition of the second lithium aryl halide (lithium bromonaphthalenyl) would yield the desired 4-bromophenyl,4'-bromonaphthalenyl M4. The notations "4" and "4'" in the foregoing example represent the substituent positions at opposite ends of the molecule or group. For example:

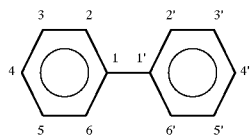

This notation is adopted as a convenience, for illustrative purposes.

To vary the terminal R groups, mixtures of various substituted primary acetylenic compounds can be used in the above synthesis.

To make H-terminated monomers, heating a dibromide precursor inside a bomb, with acetylene and a catalyst is an effective synthetic route.

If more than one —C≡C— moiety is desired in the monomer of the invention, different synthetic routes may be employed. See generally Bucca et al., supra.

Polymerization of the Monomers

The thermosets of the invention may be synthesized by exposing the foregoing monomers to heat or light to initiate cross-linking of the acetylenic moieties, according to the general reaction:

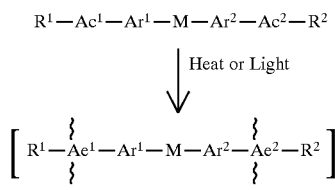

Solvents or catalysts are not generally required for these conversions.

Thermal conversion of the carbon-to-carbon triple bonds in the monomers to form the thermoset polymers is dependent on both the curing temperature and the curing time. The heating of the monomers is carried out over a curing temperature range sufficient for the cross-linking of the carbon-to-carbon triple bonds of the individual monomers to occur resulting in the formation of a single mass of cross-linked polymers. The heating of the monomers is carried out over a curing time sufficient for the cross linking of the carbon-to-carbon triple bonds of the individual monomers to occur resulting in the formation of the cross-linked polymers. In general, the curing time is inversely related to the curing temperature. The typical temperature range, the preferred temperature range, the more preferred temperature range and the most preferred temperature range for the thermal conversion of monomers to the cross-linked thermoset polymers are, typically, 150°–450° C., 200°–400° C., 225°–375° C. and 250°–350° C., respectively. The typical curing time, the preferred curing time, the more preferred curing time, and the most preferred curing time for the thermal conversion of monomers to the cross-linked thermoset polymers are, typically, 1–48 hours, 2–24 hours, 8–12 hours and 1–8 hours, respectively.

Figure 3:
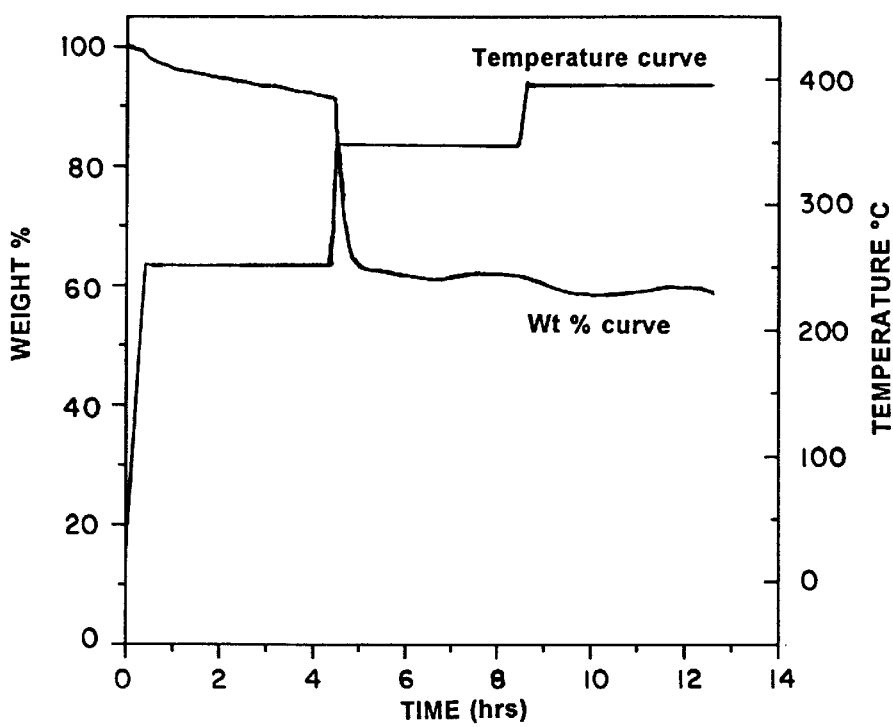
FIG. 3 is a TGA thermogram of a polymerization process according to the invention.
Figure 4:
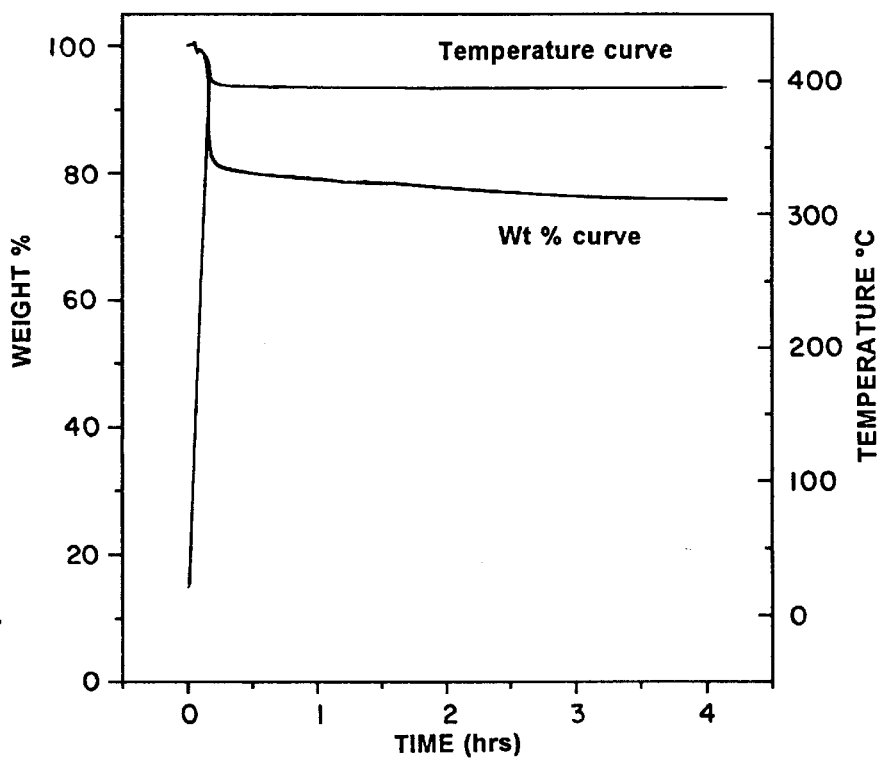
FIG. 4 is a TGA thermogram of a different polymerization process according to the invention.
Figure 5:
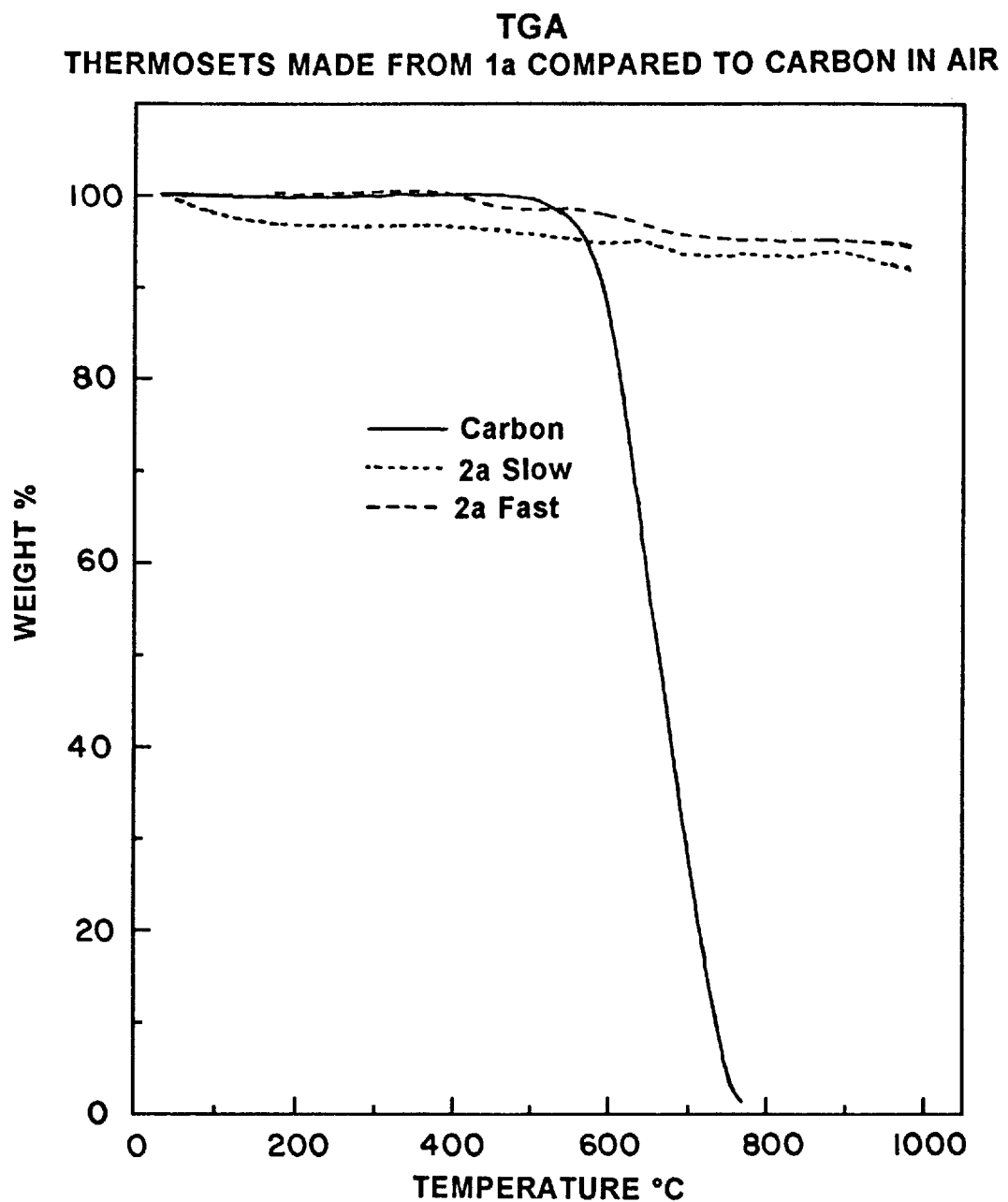
FIG. 5 is a TGA thermogram showing the thermo-oxidative stability of two embodiments of the invention, compared to carbon.

It has been found that yield from thermal conversion is related to curing temperture. FIG. 3 shows the TGA thermogram of converting monomer 1$a$ to a thermoset in a stepwise cure over about 12 hours with about 60 wt % yield. FIG. 4 shows shows the TGA thermogram of converting monomer 1$a$ to a thermoset in a single step cure over about 4 hours with about 80 wt % yield. However, excellent thermal stability can be achieved with both faster and slower cures. FIG. 5 shows the TGAs (in air) of the two samples of thermosets depicted in FIGS. 3 and 4, compared to carbon. Both showed good stability up to at least about 1000° C. The photocrosslinking process of converting the carbon-to-carbon triple bonds of the monomers into unsaturated cross-linked moieties necessary for forming the thermosetting polymers, is dependent on both the exposure time and the intensity of the light used during the photocrosslinking process. Ultraviolet (UV) light is the most preferred wavelength of light used during the photocrosslinking process. The exposure time of the monomers to the UV light is inversely related to the intensity of the UV light used. The exposure time to the UV or to other light used is that time which is sufficient for the carbon-to-carbon triple bonds of the monomers to be cross-linked to form the thermosetting polymers. The intensity of the light used is that intensity which is sufficient for the carbon-to-carbon triple bonds of the monomers to be cross-linked to form the thermosetting polymers. Furthermore, the wavelength of the light used is not limited to the UV range. The wavelength of light used is that wavelength which is sufficient for the carbon-to-carbon triple bonds of the monomers to be cross-linked to form the thermosetting polymers. The typical exposure time, the preferred exposure time, the more preferred exposure time and the most preferred exposure time are, typically, 1–100 hours, 24–36 hours, 12–24 hours and 4–8 hours, respectively. Examples of the conversion of monomers to the cross-linked thermosets are given infra.

It is believed that the cross-linking moieties, shown as ⸰ herein, will link together a combination of repeating units that will have a variety of products of the exposure of the alkynyl moieties to heat or light. For example, the Ae groups described above will likely include, but will not necessarily be limited to, the following:

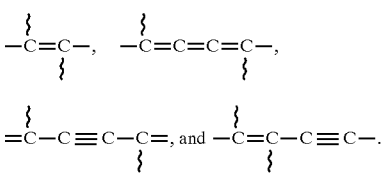

Having described the invention, the following examples are given to illustrate specific applications of the invention, including the best mode now known to perform the invention. These specific examples are not intended to limit the scope of the invention described in this application.

EXAMPLE 1

Conversion of 1,7-bis(4-phenylethynylphenyltetramethyldisiloxyl)-m-carborane (7a) To Thermoset/Ceramic A sample (11.69 mg) of 1,7-bis(4-phenylethynylphenyltetramethyldisiloxyl)-m-carborane (7a) was weighed in a platinum TGA boat and heated at 10° C./min under a nitrogen atmosphere at a flow rate of 50 cc/min to 1000° C. The monomer (7a) was initially converted into a thermoset during the heat treatment to 400° C. As the heating was continued to 1000° C., the thermoset was converted to a ceramic material (9a) with a char yield of 61%. After cooling to room temperature, the ceramic (9a) material was then heated at 10° C./min to 1000° C. under a flow of air at 50 cc/min. During the oxidative heat treatment, the material gained weight (1–2 weight-percent) attributable to oxidation on the surface.

EXAMPLE 2

Rapid Heat Treatment of 1,7-Bis(4-Phenylethynylphenyltetramethyldisiloxyl)-m-Carborane (7a) To 400° C.

A sample (9.42 mg) of 1,7-bis(4-phenylethynylphenyltetramethyldisiloxyl)-m-carborane (7a) was weighed in a platinum TGA boat and quickly heated (40° C./min) to 400° C. and held at 400° C. for 4 hours under a flow of nitrogen at 50 cc/min. Upon cooling a dark brown thermoset, which was 76% of the original weight, was obtained (8a). Conversion of the thermoset to a ceramic (9a) was accomplished by heating the thermoset to 1000° C. under a flow of argon at 50 cc/min. The material exhibited a ceramic yield of 96%. Upon cooling and reheating the ceramic to 1000° C. in air, there was a 1–2 weight percent gain, attributable to oxidation.

EXAMPLE 3

Formation of A Thermoset From 1,7-bis(4-phenylethynylphenyltetramethyldisiloxyl)-m-carborane (7a)

A sample (11.47 mg) of 1,7-bis(4-phenylethynylphenyltetramethyldisiloxyl)-m-carborane (7a) was weighed in a platinum TGA boat and heated (10° C./min) to 250° C. and held at 250° C. for four hours under a flow of nitrogen at 50 cc/min. The sample was then heated from 250° C. to 300° at 5° C./min and then held at 300° C. for four hours. Then the sample was heated from 300 to 350° C. at 5° C./min and held at 350° C. for four hours. Finally the sample was heated to 400° C. from 350° at 5° C./min and held at 400° C. for hours. Upon cooling a dark brown thermoset (8a), which was 66% of the original weight, was obtained.

EXAMPLE 4

Conversion of Thermoset (8a) To Ceramic (9a)

Conversion of the thermoset (8a) formed from Example 3 to a ceramic (9a) was accomplished by heating the thermoset to 1000° C. under a flow of air at 50 cc/min. The material exhibited a ceramic yield of 92%. Upon cooling and reheating the ceramic to 1000° C. in air there was a 1–2 weight percent gain, attributable to oxidation.

EXAMPLE 5

Formation of Thermoset (8b) From Bis(4-Phenylethynylphenyl)tetramethyldisiloxane (7b) And Its Oxidative Stability A sample (14.68 mg) of bis(4-phenylethynylphenyl) tetramethyldisiloxane (7b) was weighed in a platinum TGA boat and heated at 10° C./min under a nitrogen atmosphere at a flow rate of 50 cc/min to 1000° C. During the heat treatment to 450° C., 7b was converted into a thermoset (8b) through reaction of the acetylenic moieties. Further heating of thermoset (8b) to 1000° C. resulted in the formation of the ceramic material (9b) with a char yield of 30%.

EXAMPLE 6

Formation of Thermoset (8c) From Bis(p-Phenylethynylphenyl)dimethylsilane (7c)

A sample (10.55 mg) of bis(p-phenylethynylphenyl) dimethylsilane (7c) was weighed in a platinum TGA boat and heated at 10° C./min under a nitrogen atmosphere at a flow rate of 50 cc/min to 1000° C. During the heat treatment to 450° C., 7c was converted into a thermoset (8c) through reaction of the acetylenic moieties. The monomer (7c) was converted to a the ceramic material (9c) with a char yield of 13%.

Obviously, many modifications and variations of the present invention are possible in light of the above teachings. It is therefore to be understood that, within the scope of the appended claims, the invention may be practiced otherwise than as specifically described.

What is claimed is:

1. A thermoset polymer having a repeating unit represented by the formula:

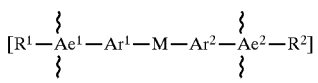

wherein $R^1$ and $R^2$ are independently selected from the group consisting of hydrogen, unsubstituted alkyl groups, substituted alkyl groups, unsubstituted aryl groups, and substituted aryl groups;

wherein $Ae^1$ and $Ae^2$ are independently selected groups with one or more unsaturated carbon-carbon bond and at least two crosslinking moieties;

wherein $Ar^1$ and $Ar^2$ are independently selected substituted or unsubstituted aromatic diradicals; and wherein M has the structure

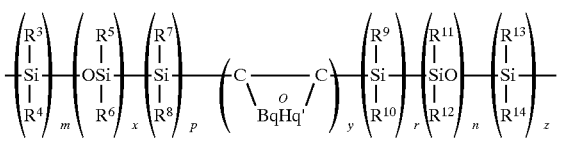

wherein m is a positive integer, wherein x, p, y, r, n, and z are independently selected integers, wherein $z \neq 0$ when $n \neq 0$, and wherein $R^3$ through $R^4$ are independently selected from the group consisting of hydrogen, unsubstituted alkyl groups, substituted alkyl groups, unsubstituted aryl groups, and substituted aryl groups.

2. The thermoset polymer of claim 1, wherein said $Ae^1$ and $Ae^2$ are independently selected from the group consisting of

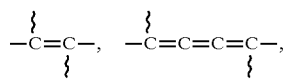

-continued

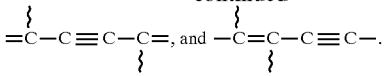

3. The thermoset polymer of claim 1, wherein m is a positive integer between 1 and 15, inclusive.

4. The thermoset polymer of claim 1, wherein x is an integer between 0 and 10, inclusive.

5. The thermoset polymer of claim 1, wherein p is an integer between 0 and 10, inclusive.

6. The thermoset polymer of claim 1, wherein y is an integer between 0 and 10, inclusive.

7. The thermoset polymer of claim 1, wherein r is an integer between 0 and 10, inclusive.

8. The thermoset polymer of claim 1, wherein n is an integer between 0 and 10, inclusive.

9. The thermoset polymer of claim 1, wherein z is an integer between 0 and 10, inclusive.

10. The thermoset polymer of claim 1, wherein $R^1$ and $R^2$ have 10 or fewer carbons.

11. The thermoset polymer of claim 1, wherein $Ar^1$ and $Ar^2$ comprise 4 or fewer aromatic rings.

12. The thermoset polymer of claim 1, wherein p=r=n=0, y is 0, 1, or 2, and z is 0, 1 or 2.

13. The thermoset polymer of claim 1, wherein p=r=0, y is 0, 1, or 2, n≠0, and z is 1 or 2.

14. The thermoset polymer of claim 1, wherein p=r=0, y is 0 or 1, and z is 1.

15. The thermoset polymer of claim 1, wherein p=r=0, and m=x=y=n=z=1.

16. The thermoset polymer of claim 1, wherein p=r=0, x is an integer between 1 and 5, inclusive, y is 1, and z is 1.

17. The thermoset polymer of claim 1, wherein p=r=x=y=n=z=0.

18. The thermoset polymer of claim 1, wherein p=r=y=n=z=0, and x≠0.

19. The thermoset polymer of claim 1, wherein x=1 and p=r=y=n=z=0.

20. The thermoset polymer of claim 1, wherein $R^1$ and $R^2$ are independently selected from the group consisting of unsubstituted alkyl groups and unsubstituted aryl groups.

21. The thermoset polymer of claim 1, wherein x=y=z=1.

22. The thermoset polymer of claim 1, wherein m is an integer between 1 and 10, inclusive, and x=p=y=r=n=z=0.

23. The thermoset polymer of claim 1, wherein m=1, z is a positive integer, x is an integer between 1 and 5, inclusive, and p=y=r=n=0.

24. The thermoset polymer of claim 1, wherein x=n=z=0 and p=y=r=1.

25. A thermoset polymer made by the process of exposing to heat or light a monomer having the formula:

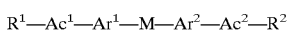

wherein $R^1$ and $R^2$ are independently selected from the group consisting of hydrogen, unsubstituted alkyl groups, substituted alkyl groups, unsubstituted aryl groups, and substituted aryl groups;

wherein $Ac^1$ and $Ac^2$ are independently selected alkynyl groups having at least 1 carbon-carbon triple bond;

wherein $Ar^1$ and $Ar^2$ are independently selected substituted or unsubstituted aromatic diradicals; and wherein M has the structure

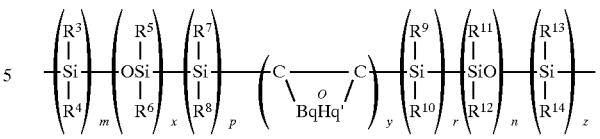

wherein m is a positive integer, wherein x, p, y, r, n, and z are independently selected integers, and wherein z≠0 when n≠0, and wherein $R^3$ through $R^{14}$ are independently selected from the group consisting of hydrogen, unsubstituted alkyl groups, substituted alkyl groups, unsubstituted aryl groups, and substituted aryl groups; and wherein said exposure to said heat or light is selected to initiate a cross-linking reaction between alkyl moieties in said monomer.

26. The thermoset polymer of claim 25, wherein p=r=0, y is 0, 1, or 2, n≠0, and z is 1 or 2.

27. The thermoset polymer of claim 25, wherein p=r=0, y is 0 or 1, n≠0, and z is 1.

28. The thermoset polymer of claim 25, wherein p=r=0, and m=x=y=n=z=1.

29. The thermoset polymer of claim 25, wherein p=r=0, x is an integer between 1 and 5, inclusive, y is 1, and z is 1.

30. The thermoset polymer of claim 25, wherein p=r=x=y=n=z=0.

31. The thermoset polymer of claim 25, wherein x=y=z=1.

32. The thermoset polymer of claim 25, wherein x=1 and y=n=z=0.

33. The thermoset polymer of claim 25, wherein $R^1$ and $R^2$ are independently selected from the group consisting of unsubstituted alkyl groups and unsubstituted aryl groups.

34. The thermoset polymer of claim 25, wherein m=1, z≠0, x is an integer between 1 and 5, inclusive, and p=y=r=n=0.

35. The thermoset polymer of claim 25, wherein m=x=n=z=0 and p=y=r=1.

36. A ceramic made by the process of pyrolyzing a precursor selected from the group consisting of:

(a) a monomer having the formula:

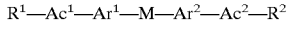

wherein $R^1$ and $R^2$ are independently selected from the group consisting of hydrogen, unsubstituted alkyl groups, substituted alkyl groups, unsubstituted aryl groups, and substituted aryl groups;

wherein $Ac^1$ and $Ac^2$ are independently selected alkynyl groups having at least 1 carbon-carbon triple bond;

wherein $Ar^1$ and $Ar^2$ are independently selected substituted or unsubstituted aromatic diradicals; and wherein M has the structure

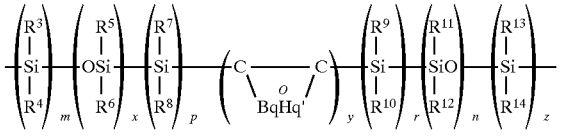

wherein m is a positive integer, wherein x, p, y, r, n, and z are independently selected integers, wherein z≠0 when n≠0, and wherein $R^3$ through $R^{14}$ are independently selected from the group consisting of hydrogen, unsubstituted alkyl groups, substituted alkyl groups, unsubstituted aryl groups, and substituted aryl groups; and (b) a thermoset polymer having a repeating unit represented by the formula:

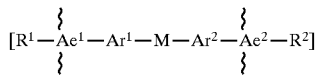

wherein $R^1$ and $R^2$ are independently selected from the group consisting of hydrogen, unsubstituted alkyl groups, substituted alkyl groups, unsubstituted aryl groups, and substituted aryl groups;
wherein $Ae^1$ and $Ae^2$ are independently selected groups with one or more unsaturated carbon-carbon bond and at least two crosslinking moieties;
wherein $Ar^1$ and $Ar^2$ are independently selected substituted or unsubstituted aromatic diradicals; and
wherein M has the structure

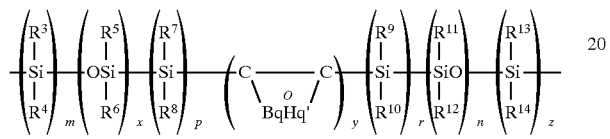

wherein m is a positive integer, wherein x, p, y, r, n, and z are independently selected integers, wherein $z \neq 0$ when $n \neq 0$, and wherein $R^3$ through $R^{14}$ are independently selected from the group consisting of hydrogen, unsubstituted alkyl groups, substituted alkyl groups, unsubstituted aryl groups, and substituted aryl groups.

37. The ceramic of claim 36, wherein said precursor is (a).
38. The ceramic of claim 36, wherein said precursor is (b).
39. A process for making a ceramic, comprising the step of:
pyrolyzing a precursor selected from the group consisting of
(a) a monomer having the formula:

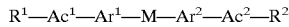

wherein $R^1$ and $R^2$ are independently selected from the group consisting of hydrogen, unsubstituted alkyl groups, substituted alkyl groups, unsubstituted aryl groups, and substituted aryl groups;
wherein $Ac^1$ and $Ac^2$ are independently selected alkynyl groups having at least 1 carbon-carbon triple bond;
wherein $Ar^1$ and $Ar^2$ are independently selected substituted or unsubstituted aromatic diradicals; and wherein M has the structure

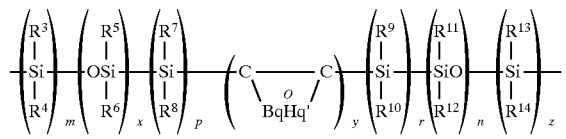

wherein m is a positive integer, wherein x, p, y, r, n, and z are independently selected integers, wherein $z \neq 0$ when $n \neq 0$, and wherein $R^3$ through $R^{14}$ are independently selected from the group consisting of hydrogen, unsubstituted alkyl groups, substituted alkyl groups, unsubstituted aryl groups, and substituted aryl groups; and
(b) a thermoset polymer having a repeating unit represented by the formula:

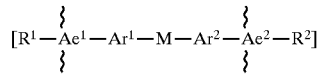

wherein $R^1$ and $R^2$ are independently selected from the group consisting of hydrogen, unsubstituted alkyl groups, substituted alkyl groups, unsubstituted aryl groups, and substituted aryl groups;
wherein $Ae^1$ and $Ae^2$ are independently selected groups with one or more unsaturated carbon-carbon bond and at least two crosslinking moieties;
wherein $Ar^1$ and $Ar^2$ are independently selected substituted or unsubstituted aromatic diradicals; and
wherein M has the structure

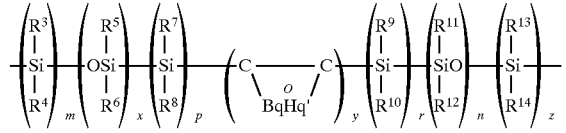

wherein m is a positive integer, wherein x, p, y, r, n, and z are independently selected integers, wherein $z \neq 0$ when $n \neq 0$, and wherein $R^3$ through $R^{14}$ are independently selected from the group consisting of hydrogen, unsubstituted alkyl groups, substituted alkyl groups, unsubstituted aryl groups, and substituted aryl groups.
40. The process of claim 39, wherein said precursor is (a).
41. The process of claim 39, wherein said precursor is (b).

* * * * *